United States Patent
Lu et al.

(10) Patent No.: US 12,331,908 B2
(45) Date of Patent: Jun. 17, 2025

(54) EMERGENCY LIGHTING DEVICE HAVING BATTERY LEVEL INDICATING FUNCTION

(71) Applicant: Xiamen PVTECH Co., Ltd., Fujian (CN)

(72) Inventors: Fuxing Lu, Fujian (CN); Chun Ming Liu, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 219 days.

(21) Appl. No.: 18/231,784

(22) Filed: Aug. 8, 2023

(65) Prior Publication Data

US 2024/0302009 A1     Sep. 12, 2024

(30) Foreign Application Priority Data

Mar. 8, 2023    (CN) .......................... 202310214575.2

(51) Int. Cl.
     *F21S 9/02*        (2006.01)
     *H02J 7/00*        (2006.01)
     *H02J 9/06*        (2006.01)

(52) U.S. Cl.
CPC .............. *F21S 9/022* (2013.01); *H02J 7/0048* (2020.01); *H02J 9/065* (2013.01)

(58) Field of Classification Search
CPC .......... F21S 9/022; H02J 7/0048; H02J 9/065; Y02B 20/40
See application file for complete search history.

(56) References Cited

U.S. PATENT DOCUMENTS

| 2015/0188347 | A1* | 7/2015 | Ruan ..................... | H02J 7/0031 320/135 |
| 2017/0307155 | A1* | 10/2017 | Brandes ................. | F21S 8/033 |
| 2024/0146100 | A1* | 5/2024 | Guo ....................... | H02J 7/0063 |

FOREIGN PATENT DOCUMENTS

| CN | 103852726 A | 6/2014 |
| CN | 108092387 A | 5/2018 |

\* cited by examiner

*Primary Examiner* — Omeed Alizada
(74) *Attorney, Agent, or Firm* — Winston Hsu (57) ABSTRACT

An emergency lighting device includes a rechargeable battery module, a charging control module, a processing module and an indicator module. The charging control module is connected to the rechargeable battery module, and has a first monitoring point and a second monitoring point. A first monitoring resistor is disposed between the first monitoring point and the positive electrode of the rechargeable battery module. The second monitoring resistor is disposed between the first and second monitoring points. The processing module is connected to the charging control module, and has a first monitoring pin and a second monitoring pin used to detect the first voltage of the first monitoring point and the second voltage of the second monitoring point respectively to perform a battery level calculating mode and obtain the estimated battery level. The processing module controls the indicator module to perform a light-emitting mode according to the estimated battery level.

10 Claims, 3 Drawing Sheets

EMERGENCY LIGHTING DEVICE HAVING BATTERY LEVEL INDICATING FUNCTION

BACKGROUND OF THE INVENTION

1. Field of the Invention

The present invention relates to an emergency lighting device, in particular to an emergency lighting device having battery level indicating function.

2. Description of the Prior Art

Emergency lighting devices can provide necessary lighting function when the lighting system cannot normally operate due to an accident, so that people can be evacuated in a short time to facilitate firefighting Thus, these lighting devices have been widely used in various buildings. However, a currently available emergency lighting device usually provides only one function and the battery thereof cannot be maintained. In addition, the service life of the battery is usually shorter than that of other electronic components, and the user cannot know whether the battery is running low. Therefore, when the currently available emergency lighting device is activated, the battery thereof may not have enough power to normally operate.

China Patent Publication No. CN102510609A, China Patent Publication No. CN107477494A and U.S. Pat. No. 5,444,378 disclose several devices with battery level detecting functions. However, the accuracy of the battery level detecting functions of these devices still needs to be improved, which cannot effectively solve the problems of prior art.

SUMMARY OF THE INVENTION

One embodiment of the present invention provides an emergency lighting device having battery level indicating function, which includes a rechargeable battery module, a charging control module, a processing module and an indicator module. The charging control module is connected to the rechargeable battery module, and has a first monitoring point and a second monitoring point. A first monitoring resistor is disposed between the first monitoring point and the positive electrode of the rechargeable battery module. The second monitoring resistor is disposed between the first monitoring point and the second monitoring point. The processing module is connected to the charging control module, and has a first monitoring pin and a second monitoring pin used to detect the first voltage of the first monitoring point and the second voltage of the second monitoring point respectively to perform a battery level calculating mode in order to generate the estimated battery level of the rechargeable battery module. The indicator module is connected to the processing module. The processing module controls the indicator module according to the estimated battery level, such that the indicator module performs a light-emitting mode corresponding to the estimated battery level.

In one embodiment, the processing module executes the battery level calculating mode to calculate the average value of the first voltage and the second voltage so as to obtain the estimated battery level.

In one embodiment, the processing module further includes a first control pin and a second control pin. The charging control module has a first switch, a second switch, a third switch and a fourth switch. The first control pin is connected to the positive electrode of the rechargeable battery module via the first switch and the second switch, and the second control pin is connected to the positive electrode of the rechargeable battery module via the third switch and the fourth switch. The processing module outputs the low-level signals via the first control pin and the second control pin respectively during the battery level calculating mode in order to turn off the first switch, the second switch, the third switch and the fourth switch.

In one embodiment, the emergency lighting device further includes a manual test switch module for generating a mode switching signal.

In one embodiment, the processing module further includes a test pin connected to the manual test switch module so as to receive the mode switching signal.

In one embodiment, the processing module executes the battery level calculating mode according to the mode switching signal.

In one embodiment, the processing module executes a transportation mode according to the mode switching signal.

In one embodiment, the processing module executes a test mode according to the mode switching signal.

In one embodiment, the emergency lighting device further includes an emergency power source module and an emergency light source module. The emergency light source module is connected to the processing module and the rechargeable battery module, and the emergency light source module is connected to the emergency power source module. The rechargeable battery module drives the emergency power source module, and the processing module adjusts the voltage, applied to the emergency light source module, of the emergency power source module according to the estimated battery level, such that the working time of the emergency light source module is equal to or greater than a default time threshold.

In one embodiment, the emergency lighting device further includes an ambient light detecting module connected to the processing module to detect an ambient light intensity in order to generate an ambient light brightness signal. The processing module adjusts the voltage, applied to the emergency light source module, of the emergency power source module according to the ambient light brightness signal so as to change the brightness of the emergency light source module.

The emergency lighting device having battery level indicating function in accordance with the embodiments of the present invention may have the following advantages:

(1) In one embodiment of the present invention, the emergency lighting module had a rechargeable battery module, a processing module, a charging control module and an indicator module. The charging control module has a multi-point monitoring circuit capable of monitoring the voltage of the rechargeable battery module. The processing module can calculate the estimated battery level of the rechargeable battery module according to the above voltage and control the indicator module to execute a light-emitting mode corresponding to the estimated battery level, such that the estimated battery level can be visualized. Thus, the use can swiftly know the battery level state of the rechargeable battery module in order to charge the rechargeable battery module or take other necessary measures on time.

(2) In one embodiment of the present invention, the emergency lighting module has the rechargeable battery module, the processing module, the charging control module and the indicator module. The charging control module has the multi-point monitoring circuit capable of monitoring the voltage of the rechargeable battery module. The processing module can perform the battery level calculating mode corresponding to the multi-point monitoring circuit so as to precisely calculate the estimated battery level of the rechargeable battery module, which can effectively enhance the precision of the multi-point monitoring circuit. Accordingly, the user can accurately know the battery level state of the rechargeable battery module.

(3) In one embodiment of the present invention, the emergency lighting device further includes a manual test switch module. The user can manually operate the manual test switch module to generate different mode switching signals so as to control the processing module to execute a battery level calculating mode, a transportation mode or a test mode. As a result, the emergency lighting device can perform different operational modes having different functions via a single button (the manual test switch module), which is more convenient in use.

(4) In one embodiment of the present invention, the emergency lighting device further includes an emergency power source module and an emergency light source module. The emergency power source module is connected to the processing module and the rechargeable battery module. The emergency light source module is connected to the emergency power source module. The processing module can adjust the voltage, applied to the emergency light source module, of the emergency power source module according to the estimated battery level in order to make sure that the working time of the emergency light source module can be greater than a default time threshold (e.g., 90 minutes, 120 minutes . . . ). Therefore, the working time of the emergency lighting device can always conform to actual requirements even if the rechargeable battery module of the emergency lighting device is not fully charged.

(5) In one embodiment of the present invention, the emergency lighting device can further include an ambient light detecting module, which can detect the ambient light intensity to generate an ambient light brightness signal. The processing module can adjust the voltage, applied to the emergency light source module, of the emergency light source module according to the ambient light brightness signal in order to change the brightness of the emergency light source module. The above mechanism can more effectively take advantage of the energy provided by the rechargeable battery module so as to increase the service life of the rechargeable battery module.

(6) In one embodiment of the present invention, the safety and service life of the emergency lighting device can be significantly improved, such that the overall performance of the emergency lighting deice can be greatly enhanced. Therefore, the emergency lighting device can be more comprehensive in application and more flexible in use.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
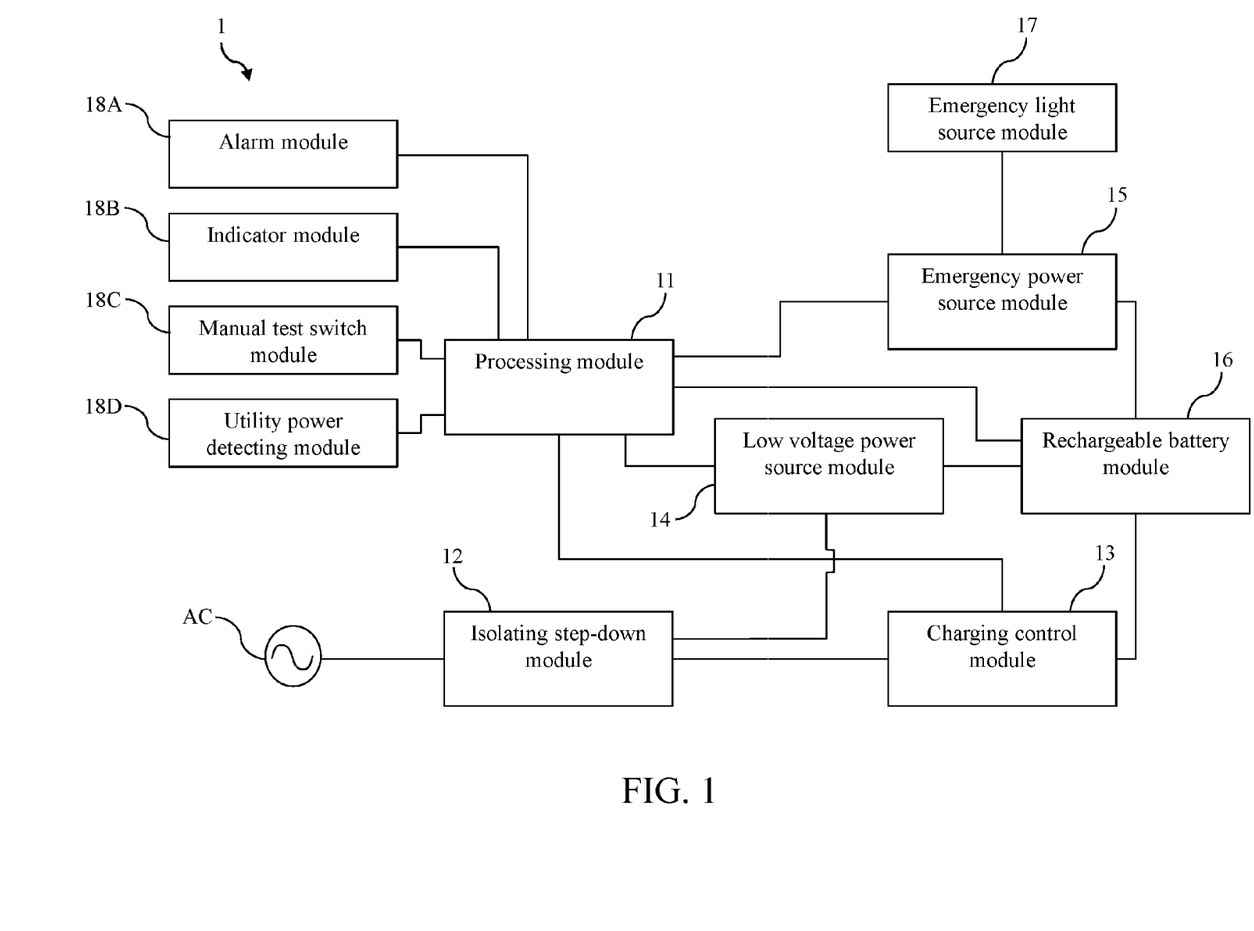
FIG. 1 is a block diagram of an emergency lighting device having battery level indicating function in accordance with one embodiment of the present invention.

Please refer to FIG. 1, which is a block diagram of an emergency lighting device having battery level indicating function in accordance with one embodiment of the present invention. As shown in FIG. 1, the emergency lighting device 1 includes a processing module 11, an isolating step-down module 12, a charging control module 13, a low voltage power source module 14, an emergency power source module 15, a rechargeable battery module 16, an emergency light source module 17, an alarm module 18A, an indicator module 18B, a manual test switch module 18C and a utility power detecting module 18D.

The processing module 11 is connected to the charging control module 13, the low voltage power source module 14, the emergency power source module 15, the rechargeable battery module 16, the emergency light source module 17, the alarm module 18A, the indicator module 18B, the manual test switch module 18C and the utility power detecting module 18D. In one embodiment, the processing module 11 may be a microcontroller unit (MCU), a central-processing unit (CPU), an application specific integrated circuit (ASIC), a field programmable gate array (FPGA) or other similar components. In one embodiment, the rechargeable battery module 16 may be a Li battery, a NiCd battery, a NiMH battery or other similar components. In one embodiment, the alarm module 18A may be a buzzer, a siren or other similar components. In one embodiment, the utility power detecting module 18D can be an input voltage detecting circuit.

The emergency power source module 15 can be connected to the rechargeable battery module 16 and the emergency power source module 17. In one embodiment, the emergency power source module 15 may be a boost converter, a buck converter or a buck-boost converter.

The low voltage power source module 14 is connected to the rechargeable battery module 16 and the isolating step-down module 12. In one embodiment, the low voltage power source module 14 may be a low voltage power source circuit or other similar circuits.

The charging control module 13 is connected to the isolating step-down module 12 and the rechargeable battery module 16. In one embodiment, the isolating step-down module 12 is connected to the utility power AC. The isolating step-down module 12 may include one or more of a rectifying circuit, a filtering circuit, an EMI circuit and an anti-surge circuit.

When the isolating step-down circuit 12 is connected to the utility power AC, the isolating step-down circuit 12 can provide the isolating function and the step-down function, and can drive the low voltage power source module 14 to power the emergency light source module 17. When the utility power detecting module 18D detects that the isolating step-down module 12 fails to be connected to the utility power AC (e.g., power failure), the charging control module 13 controls the rechargeable battery module 16 to power the emergency light source module 17.

The embodiment just exemplifies the present invention and is not intended to limit the scope of the present invention; any equivalent modification and variation according to the spirit of the present invention is to be also included within the scope of the following claims and their equivalents.

Figure 2:
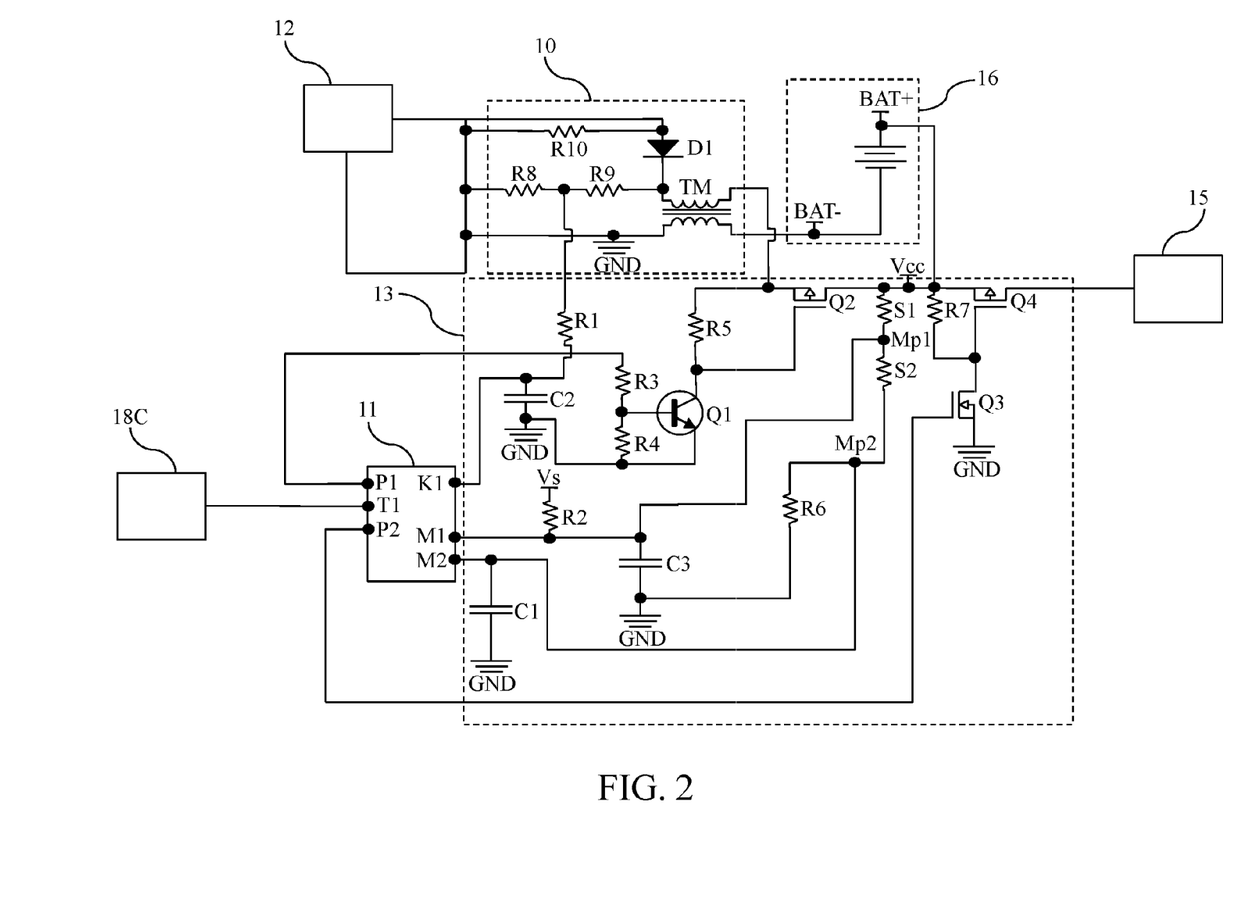
FIG. 2 is a circuit diagram of a charging control module of the emergency lighting device having battery level indicating function in accordance with one embodiment of the present invention.

Please refer to FIG. 2, which is a circuit diagram of a charging control module of the emergency lighting device having battery level indicating function in accordance with one embodiment of the present invention; please also refer to FIG. 1. FIG. 2 illustrates one of the circuit designs of the charging control module 13, and the circuit design of the charging control module 13 can be changed according to actual requirements. As shown in FIG. 1 and FIG. 2, the processing module 11 has a test pin T1, a first monitoring pin M1, a second monitoring pin M2, a first control pin P1, a second control pin P2 and a signal pin K1 (GND stands for the grounding point). The charging control module 13 includes a multi-point monitoring circuit having a first resistor R1, a second resistor R2, a third resistor R3, a fourth resistor R4, a fifth resistor R5, a sixth resistor R6, a seventh resistor R7, a first monitoring resistor S1, a second monitoring resistor S2, a first capacitor C1, a second capacitor C2, a third capacitor C3, a first switch Q1, a second switch Q2, a third switch Q3 and a fourth switch Q4. The multi-point monitoring circuit of the charging control module 13 has a first monitoring point M1 and a second monitoring point M2.

The test pin T1 is connected to the manual test switch module 18C. The user can operate the manual test switch module 18C to generate a mode switching signal. In one embodiment, the manual test switch module 18C may be a button. In another embodiment, the manual test switch module 18C may be a knob or other similar components.

The first control pin P1 is connected to the positive electrode BAT+ of the rechargeable battery module 16 via the first switch Q1 and the second switch Q2.

The second control pin P2 is connected to the positive electrode BAT+ of the rechargeable battery module 16 via the third switch Q3 and the fourth switch Q4.

In this embodiment, the first switch Q1 is a bipolar junction transistor (BJT); the second switch Q1, the third switch Q3 and the fourth switch Q4 are MOSFETs.

The first monitoring pin M1 is connected to the first monitoring point Mp1. The second monitoring pin M2 is connected to the second monitoring point Mp2. There is first monitoring resistor S1 between the first monitoring point Mp1 and the positive electrode BAT+ of the rechargeable battery module 16. There is second monitoring resistor S2 between the first monitoring point Mp1 and the second monitoring point Mp2. In one embodiment, the first monitoring point Mp1 is connected to one end of the first monitoring resistor S1, one end of the second monitoring resistor S2, one end of the third capacitor C3 and the first monitoring pin M1. The other end of the first monitoring resistor S1 is connected to the positive electrode BAT+ of the rechargeable battery module 16 and the operating voltage source Vcc. The second monitoring point Mp2 is connected to the other end of the second monitoring resistor S2, one end of the sixth resistor R6 and the second monitoring pin M2. The other end of the sixth resistor R6 is connected to the other end of the third capacitor C3 and the grounding point GND. Further, the voltage source Vs (e.g., 5V . . . ) is connected to the first monitoring point Mp1 via the second resistor R2. The second monitoring point Mp2 is connected to the grounding point GND via the first capacitor C1.

Moreover, the emergency lighting device 1 may further include a connecting circuit 10. The connecting circuit 10 includes an eighth resistor R8, a ninth resistor R9, a tenth resistor R10, a transformer TM and a diode D1. The signal pin K1 is connected to the connecting circuit 10 and the charging control module 13, and the connecting circuit 10 is connected to the isolating step-down module 12, the charging control module 13 and the rechargeable battery module 16. The connecting circuit 10 is connected to the negative electrode BAT− of the rechargeable battery module 16.

The user can press the manual test switch module 18C to control the processing module 11 in order to execute several modes, such as a battery level calculating mode, a transportation mode and a test mode. For instance, the user can hold the manual test switch module 18C for 3 seconds to enter the test mode. In this mode, the processing module 11 checks whether all modules normally operate, and controls the alarm module 18A to generate an alarm sound when any one of the modules malfunctions. For example, the user can swiftly press the manual test switch module 18C for 3 times within 2 seconds in order to enter the transportation mode. In this mode, the processing module 11 can turn off all modules and then enter the sleep state. When the utility power detecting module 18D detects that the isolating step-down module 12 is connected to the utility power AC, the processing module 11 wakes up all modules again so as to enter the operating mode.

For example, the user can swiftly press the manual test switch module 18C for 5 times within 3 seconds in order to enter the battery level calculating mode. In this mode, the processing module 11 outputs low-level signals via the first control pin P1 and the second control pin P2 with a view to turning off the first switch Q1, the second switch Q2, the third switch Q3 and the fourth switch Q4. Then, the processing module 11 can detect the first voltage of the first monitoring point Mp1 and the second voltage of the second monitoring point Mp2 via the first monitoring pin M1 and the second monitoring pin M2 respectively so as to calculate the estimated battery level of the rechargeable battery module 16. In this embodiment, the processing module 11 executes the battery level calculating mode to calculate the average value of the first voltage and the second voltage in order to obtain the estimated battery level. Then, the processing module 11 can control the indicator module 18B to perform the light-emitting mode corresponding to the estimated battery level according to the estimated battery level. For instance, when the estimated battery level of the rechargeable battery module 16 is 80%~100% of the maximal battery level thereof, the indicator module 18B is in on state. When the estimated battery level of the rechargeable battery module 16 is less than 80% of the maximal battery level thereof, the indicator module 18B flashes 2 times. When the estimated battery level of the rechargeable battery module 16 is less than 50% of the maximal battery level thereof, the indicator module 18B flashes 3 times. When the estimated battery level of the rechargeable battery module 16 is less than 30% of the maximal battery level thereof, the indicator module 18B flashes 4 times. Via the above mechanism, the estimated battery level of the rechargeable battery module 16 can be visualized. In this way, the user can immediately know the battery level state of the rechargeable battery module 16 in order to charge the rechargeable battery module 16 or take other necessary measures on time. When the estimated battery level of the rechargeable battery module 16 is less than 10% of the maximal battery level thereof, the processing module 11 can determine that the battery level of the rechargeable battery module 16 is too low. Meanwhile, the processing module 11 can control the alarm module 18A to generate an alarm sound to remind the user to charge the rechargeable battery module 16. For example, when the estimated battery level of the rechargeable battery module 16 is 80%~100% of the maximal battery level thereof, the brightness of the indicator module 18B is equal to the maximal brightness thereof. When the estimated battery level of the rechargeable battery module 16 is less than 80% of the maximal battery level thereof, the brightness of the indicator module 18B is 80% of the maximal brightness thereof. When the estimated battery level of the rechargeable battery module 16 is less than 50% of the maximal battery level thereof, the brightness of the indicator module 18B is 50% of the maximal brightness thereof. When the estimated battery level of the rechargeable battery module 16 is less than 30% of the maximal battery level thereof, the brightness of the indicator module 18B is 30% of the maximal brightness thereof. When the estimated battery level of the rechargeable battery module 16 is less than 10% of the maximal battery level thereof, the processing module 11 can determine that the battery level of the rechargeable battery module 16 is too low. Meanwhile, the processing module 11 can control the alarm module 18A to generate an alarm sound to remind the user to charge the rechargeable battery module 16.

As set forth above, the emergency lighting device 1 can perform various operational modes having different functions by a single button (the manual test switch module 18C), so is convenient in use.

Moreover, the emergency lighting device 1 can further have the dynamic voltage adjusting mechanism. The processing module 11 can adjust the voltage, applied to the emergency light source module 17, of the emergency power source module 15 according to the estimated battery level, such that the working time of the emergency light source module 17 can be greater than or equal to a default time threshold (e.g., 90 minutes, 120 minutes . . . ). For example, when the estimated battery level of the rechargeable battery module 16 is 80%~100% of the maximal battery level thereof, the processing module 11 can drive the emergency light source module 17 by the maximal driving voltage thereof. When the estimated battery level of the rechargeable battery module 16 is 70%~80% of the maximal battery level thereof, the processing module 11 can drive the emergency light source module 17 by 96% of the maximal driving voltage thereof. When the estimated battery level of the rechargeable battery module 16 is 50%-70% of the maximal battery level thereof, the processing module 11 can drive the emergency light source module 17 by 95% of the maximal driving voltage thereof. When the estimated battery level of the rechargeable battery module 16 is 30%~50% of the maximal battery level thereof, the processing module 11 can drive the emergency light source module 17 by 94% of the maximal driving voltage thereof. When the estimated battery level of the rechargeable battery module 16 is less than 30% of the maximal battery level thereof, the processing module 11 can drive the emergency light source module 17 by 50% of the maximal driving voltage thereof. In this way, the working time of the emergency lighting device 1 can always conform to actual requirements even if the rechargeable battery module 16 of the emergency lighting device 1 is not fully charged.

As previously stated, the charging control module 13 of the emergency lighting device 1 has the special multi-point monitoring circuit capable of monitoring the voltage of the rechargeable battery module 16. Therefore, the processing module 11 of the emergency lighting device 1 can calculate the estimated battery level of the rechargeable battery module 16, and then control the indicator module 16 to perform the light-emitting mode corresponding to the estimated battery level. Thus, the estimated battery level can be visualized. Accordingly, the user can immediately know the battery level state of the rechargeable battery module 16 so as to charge the rechargeable battery module 16 or take other necessary measures on time. Accordingly, the safety and service life of the emergency lighting device 1 can always meet actual requirements.

Furthermore, the processing module 11 of the emergency lighting device 1 can further execute the battery level calculating mode corresponding to the above multi-point monitoring circuit so as to accurately calculate the estimated battery level of the rechargeable battery module 16, so the precision of the multi-point monitoring circuit can be further improved. As a result, the user can more accurately know the battery level state of the rechargeable battery module 16.

The embodiment just exemplifies the present invention and is not intended to limit the scope of the present invention; any equivalent modification and variation according to the spirit of the present invention is to be also included within the scope of the following claims and their equivalents.

It is worthy to point out that the user cannot know whether the battery of a currently available emergency lighting device is running low. Therefore, when the emergency lighting device is activated, the battery thereof may not have enough power to normally operate. according to one embodiment of the present invention, the emergency lighting module had a rechargeable battery module, a processing module, a charging control module and an indicator module. The charging control module has a multi-point monitoring circuit capable of monitoring the voltage of the rechargeable battery module. The processing module can calculate the estimated battery level of the rechargeable battery module according to the above voltage and control the indicator module to execute a light-emitting mode corresponding to the estimated battery level, such that the estimated battery level can be visualized. Thus, the use can swiftly know the battery level state of the rechargeable battery module in order to charge the rechargeable battery module or take other necessary measures on time.

According to one embodiment of the present invention, the emergency lighting module has the rechargeable battery module, the processing module, the charging control module and the indicator module. The charging control module has the multi-point monitoring circuit capable of monitoring the voltage of the rechargeable battery module. The processing module can perform the battery level calculating mode corresponding to the multi-point monitoring circuit so as to precisely calculate the estimated battery level of the rechargeable battery module, which can effectively enhance the precision of the multi-point monitoring circuit. Accordingly, the user can accurately know the battery level state of the rechargeable battery module.

Also, according to one embodiment of the present invention, the emergency lighting device further includes a manual test switch module. The user can manually operate the manual test switch module to generate different mode switching signals so as to control the processing module to execute a battery level calculating mode, a transportation mode or a test mode. As a result, the emergency lighting device can perform different operational modes having different functions via a single button (the manual test switch module), which is more convenient in use.

Further, according to one embodiment of the present invention, the emergency lighting device further includes an emergency power source module and an emergency light source module. The emergency power source module is connected to the processing module and the rechargeable battery module. The emergency light source module is connected to the emergency power source module. The processing module can adjust the voltage, applied to the emergency light source module, of the emergency power source module according to the estimated battery level in order to make sure that the working time of the emergency light source module can be greater than a default time threshold. Therefore, the working time of the emergency lighting device can always conform to actual requirements even if the rechargeable battery module of the emergency lighting device is not fully charged.

Moreover, according to one embodiment of the present invention, the emergency lighting device can further include an ambient light detecting module, which can detect the ambient light intensity to generate an ambient light brightness signal. The processing module can adjust the voltage, applied to the emergency light source module, of the emergency light source module according to the ambient light brightness signal in order to change the brightness of the emergency light source module. The above mechanism can more effectively take advantage of the energy provided by the rechargeable battery module so as to increase the service life of the rechargeable battery module.

Furthermore, according to one embodiment of the present invention, the safety and service life of the emergency lighting device can be significantly improved, such that the overall performance of the emergency lighting deice can be greatly enhanced. Therefore, the emergency lighting device can be more comprehensive in application and more flexible in use. Accordingly, the emergency lighting device having battery level indicating function according to the embodiments of the present invention can definitely achieve great technical effects.

Figure 3:
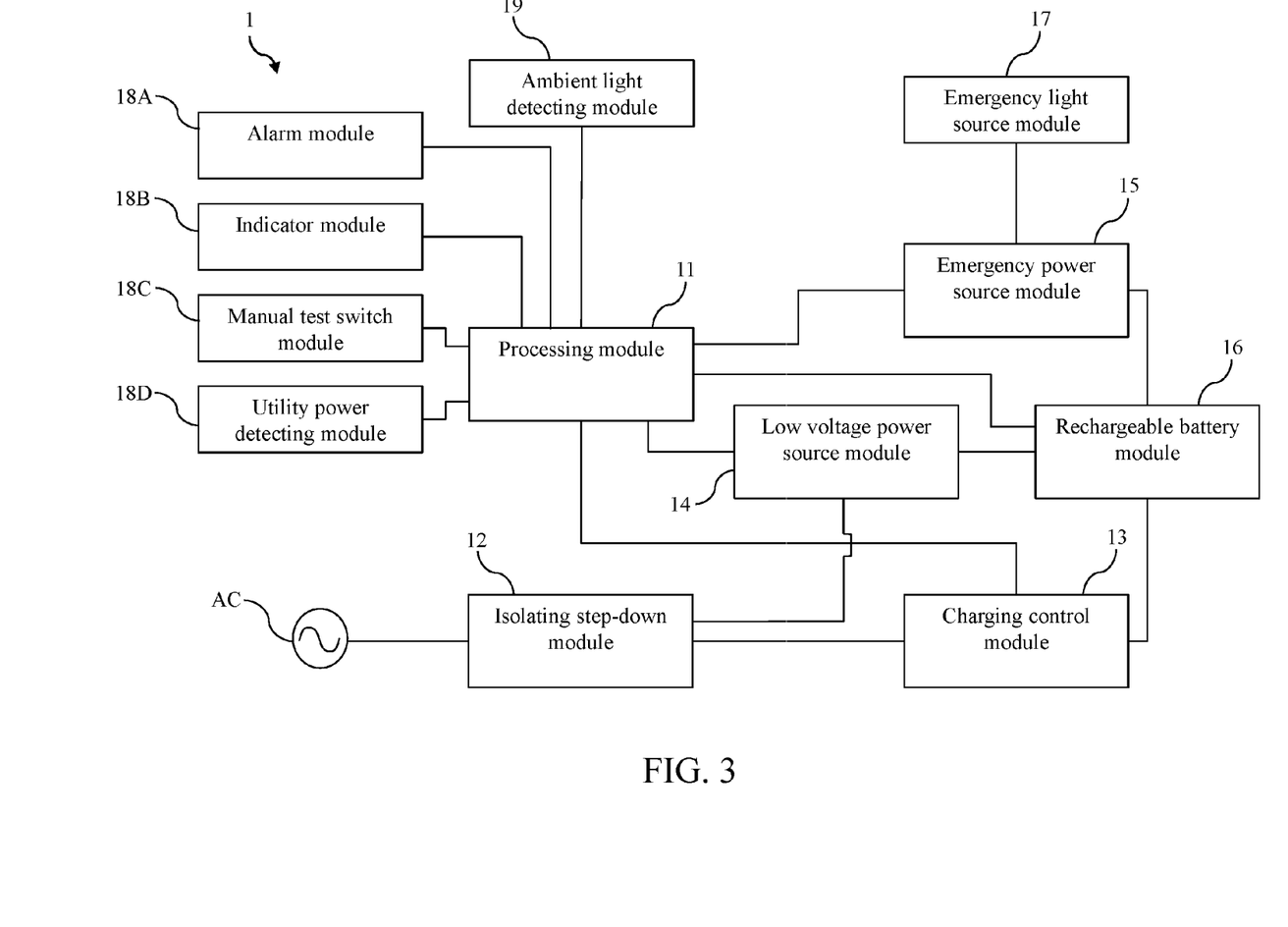
FIG. 3 is a block diagram of an emergency lighting device having battery level indicating function in accordance with another embodiment of the present invention.

Please refer to FIG. 3, which is a block diagram of an emergency lighting device having battery level indicating function in accordance with another embodiment of the present invention. As shown in FIG. 3, the emergency lighting device 1 includes a processing module 11, an isolating step-down module 12, a charging control module 13, a low voltage power source module 14, an emergency power source module 15, a rechargeable battery module 16, an emergency light source module 17, an alarm module 18A, an indicator module 18B, a manual test switch module 18C and a utility power detecting module 18D.

The difference between this embodiment and the previous embodiment is that the emergency lighting device 1 further includes an ambient light detecting module 19, which is connected to the processing module 11. In one embodiment, the ambient light detecting module 19 may be an ambient light sensor, such as a photo transistor, a photo diode, etc. In one embodiment, the indicator module 18B may be a LED, a LED array or other similar components. The ambient light detecting module 19 can detect the ambient light intensity to generate an ambient light brightness signal. afterward, the processing module 11 can adjust the voltage, applied to the emergency light source module 17, of the emergency light source module 15 in order to change the brightness of the emergency light source module 17. For example, when the ambient light intensity is high, the processing module 11 can turn off the emergency light source module 17. When the ambient light intensity decreases, the processing module 11 can decrease the brightness of the emergency light source module 17. When the ambient light intensity is low, the processing module 11 can adjust the brightness of the emergency light source module 17 to the maximal brightness thereof. The above mechanism can more effectively take advantage the energy provided by the rechargeable battery module 16 (or the utility power AC) and increase the service of the rechargeable battery module 16.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the emergency lighting module had a rechargeable battery module, a processing module, a charging control module and an indicator module. The charging control module has a multi-point monitoring circuit capable of monitoring the voltage of the rechargeable battery module. The processing module can calculate the estimated battery level of the rechargeable battery module according to the above voltage and control the indicator module to execute a light-emitting mode corresponding to the estimated battery level, such that the estimated battery level can be visualized. Thus, the use can swiftly know the battery level state of the rechargeable battery module in order to charge the rechargeable battery module or take other necessary measures on time.

According to one embodiment of the present invention, the emergency lighting module has the rechargeable battery module, the processing module, the charging control module and the indicator module. The charging control module has the multi-point monitoring circuit capable of monitoring the voltage of the rechargeable battery module. The processing module can perform the battery level calculating mode corresponding to the multi-point monitoring circuit so as to precisely calculate the estimated battery level of the rechargeable battery module, which can effectively enhance the precision of the multi-point monitoring circuit. Accordingly, the user can accurately know the battery level state of the rechargeable battery module.

Also, according to one embodiment of the present invention, the emergency lighting device further includes a manual test switch module. The user can manually operate the manual test switch module to generate different mode switching signals so as to control the processing module to execute a battery level calculating mode, a transportation mode or a test mode. As a result, the emergency lighting device can perform different operational modes having different functions via a single button (the manual test switch module), which is more convenient in use.

Further, according to one embodiment of the present invention, the emergency lighting device further includes an emergency power source module and an emergency light source module. The emergency power source module is connected to the processing module and the rechargeable battery module. The emergency light source module is connected to the emergency power source module. The processing module can adjust the voltage, applied to the emergency light source module, of the emergency power source module according to the estimated battery level in order to make sure that the working time of the emergency light source module can be greater than a default time threshold. Therefore, the working time of the emergency lighting device can always conform to actual requirements even if the rechargeable battery module of the emergency lighting device is not fully charged.

Moreover, according to one embodiment of the present invention, the emergency lighting device can further include an ambient light detecting module, which can detect the ambient light intensity to generate an ambient light brightness signal. The processing module can adjust the voltage, applied to the emergency light source module, of the emergency light source module according to the ambient light brightness signal in order to change the brightness of the emergency light source module. The above mechanism can more effectively take advantage of the energy provided by the rechargeable battery module so as to increase the service life of the rechargeable battery module.

Furthermore, according to one embodiment of the present invention, the safety and service life of the emergency lighting device can be significantly improved, such that the overall performance of the emergency lighting deice can be greatly enhanced. Therefore, the emergency lighting device can be more comprehensive in application and more flexible in use.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An emergency lighting device having battery level indicating function, comprising:
   a rechargeable battery module;
   a charging control module connected to the rechargeable battery module, and having a first monitoring point and a second monitoring point, wherein a first monitoring resistor is disposed between the first monitoring point and a positive electrode of the rechargeable battery module, and a second monitoring resistor is disposed between the first monitoring point and the second monitoring point;
   a processing module connected to the charging control module, and having a first monitoring pin and a second monitoring pin configured to detect a first voltage of the first monitoring point and a second voltage of the second monitoring point respectively to perform a battery level calculating mode in order to generate an estimated battery level of the rechargeable battery module; and
   an indicator module connected to the processing module;
   wherein the processing module is configured to control the indicator module according to the estimated battery level, whereby the indicator module performs a light-emitting mode corresponding to the estimated battery level.

2. The emergency lighting device having battery level indicating function as claimed in claim 1, wherein the processing module is configured to execute the battery level calculating mode to calculate an average value of the first voltage and the second voltage so as to obtain the estimated battery level.

3. The emergency lighting device having battery level indicating function as claimed in claim 1, wherein the processing module further comprises a first control pin and a second control pin, and the charging control module has a first switch, a second switch, a third switch and a fourth switch, wherein the first control pin is connected to a positive electrode of the rechargeable battery module via the first switch and the second switch, and the second control pin is connected to the positive electrode of the rechargeable battery module via the third switch and the fourth switch, wherein the processing module is configured to output low-level signals via the first control pin and the second control pin respectively during the battery level calculating mode in order to turn off the first switch, the second switch, the third switch and the fourth switch.

4. The emergency lighting device having battery level indicating function as claimed in claim 1, further comprising a manual test switch module configured to generate a mode switching signal.

5. The emergency lighting device having battery level indicating function as claimed in claim 4, wherein the processing module further comprises a test pin connected to the manual test switch module so as to receive the mode switching signal.

6. The emergency lighting device having battery level indicating function as claimed in claim 5, wherein the processing module is configured to execute the battery level calculating mode according to the mode switching signal.

7. The emergency lighting device having battery level indicating function as claimed in claim 5, wherein the processing module is configured to execute a transportation mode according to the mode switching signal.

8. The emergency lighting device having battery level indicating function as claimed in claim 5, wherein the processing module is configured to execute a test mode according to the mode switching signal.

9. The emergency lighting device having battery level indicating function as claimed in claim 1, further comprising an emergency power source module and an emergency light source module, wherein the emergency light source module is connected to the processing module and the rechargeable battery module, and the emergency light source module is connected to the emergency power source module, wherein the rechargeable battery module is configured to drive the emergency power source module, and the processing module is configured to adjust a voltage, applied to the emergency light source module, of the emergency power source module according to the estimated battery level, whereby a working time of the emergency light source module is equal to or greater than a default time threshold.

10. The emergency lighting device having battery level indicating function as claimed in claim 9, further comprising an ambient light detecting module connected to the processing module and configured to detect an ambient light intensity in order to generate an ambient light brightness s signal, wherein the processing module is configured to adjust the voltage, applied to the emergency light source module, of the emergency power source module according to the ambient light brightness signal so as to change a brightness of the emergency light source module.

\* \* \* \* \*